(12) United States Patent
Corbin

(10) Patent No.: US 10,637,221 B2
(45) Date of Patent: Apr. 28, 2020

(54) WALL PLATE BRACKET WITH INTEGRAL STRAIGHT EDGE AND METHOD OF USING SAME

(71) Applicant: Vanco International, LLC, Batavia, IL (US)

(72) Inventor: O. Bradley Corbin, Amelia Island, FL (US)

(73) Assignee: Vanco International, LLC, Batavia, IL (US)

( * ) Notice: Subject to any disclaimer, the term of this patent is extended or adjusted under 35 U.S.C. 154(b) by 0 days.

(21) Appl. No.: 15/936,690

(22) Filed: Mar. 27, 2018

(65) Prior Publication Data

US 2018/0375309 A1     Dec. 27, 2018

Related U.S. Application Data

(63) Continuation of application No. 14/989,007, filed on Jan. 6, 2016, now Pat. No. 10,056,749.

(60) Provisional application No. 62/100,476, filed on Jan. 6, 2015.

(51) Int. Cl.
    *H02G 3/12*        (2006.01)
    *H02G 3/14*        (2006.01)
    *G02B 6/44*        (2006.01)

(52) U.S. Cl.
    CPC ........... *H02G 3/123* (2013.01); *G02B 6/4441* (2013.01); *G02B 6/4466* (2013.01); *H02G 3/14* (2013.01)

(58) Field of Classification Search
    USPC ............................................ 33/528, DIG. 10
    See application file for complete search history.

(56) References Cited

U.S. PATENT DOCUMENTS

| | | | | |
|---|---|---|---|---|
| 2,540,032 A | * | 1/1951 | Allen | H02G 3/14 33/197 |
| 2,733,513 A | * | 2/1956 | Gatineau | H02G 3/12 33/194 |
| 2,788,151 A | * | 4/1957 | Shore | H02G 3/121 220/3.4 |
| 2,992,490 A | * | 7/1961 | Hay | E04G 21/1841 33/528 |
| 3,522,658 A | * | 8/1970 | Howell | B25H 7/00 248/200.1 |
| 4,533,060 A | * | 8/1985 | Medlin | H02G 3/125 220/3.3 |
| 5,222,303 A | * | 6/1993 | Jardine | G01B 3/02 33/528 |
| 5,813,130 A | * | 9/1998 | MacDowell | G01C 9/28 33/528 |

(Continued)

*Primary Examiner* — Christopher W Fulton
(74) *Attorney, Agent, or Firm* — Charles T. Riggs, Jr.

(57) ABSTRACT

A wall plate bracket includes integral straight edges used to quickly, easily and precisely define an area on a wall where a wall opening for the bracket is to be cut. The integral straight edges are formed along a top or bottom edge and a side edge of a generally rectangular front face plate of the bracket. The front face plate is held against a wall, and an L-shaped line is drawn along the straight edges. The bracket is then rotated 180 degrees and the ends of the straight edges are aligned at the ends of the previously drawn line. Another L-shaped line is then made or drawn along the straight edges, resulting in the two drawn L-shaped lines together forming a proper rectangle defining the wall opening to be cut.

20 Claims, 6 Drawing Sheets

(56) References Cited

U.S. PATENT DOCUMENTS

| | | | | |
|---|---|---|---|---|
| 6,093,890 | A * | 7/2000 | Gretz | H02G 3/123 |
| | | | | 174/480 |
| 6,223,445 | B1 * | 5/2001 | Schuette, Jr. | B25H 7/04 |
| | | | | 33/528 |
| 7,216,438 | B2 * | 5/2007 | Rice | G01B 3/04 |
| | | | | 33/494 |
| 7,301,099 | B1 * | 11/2007 | Korcz | H02G 3/14 |
| | | | | 174/135 |
| 7,495,171 | B2 * | 2/2009 | Gorin | H02G 3/085 |
| | | | | 174/66 |
| 7,816,604 | B1 * | 10/2010 | Gretz | H01R 25/006 |
| | | | | 174/135 |
| 8,403,289 | B1 * | 3/2013 | Rinderer | H02G 3/126 |
| | | | | 174/480 |
| 10,056,749 | B1 * | 8/2018 | Corbin | H02G 3/123 |
| 2004/0083617 | A1 * | 5/2004 | Bielen | H01R 13/748 |
| | | | | 33/528 |
| 2005/0011079 | A1 * | 1/2005 | Sikora, Jr. | B25H 7/00 |
| | | | | 33/566 |

* cited by examiner

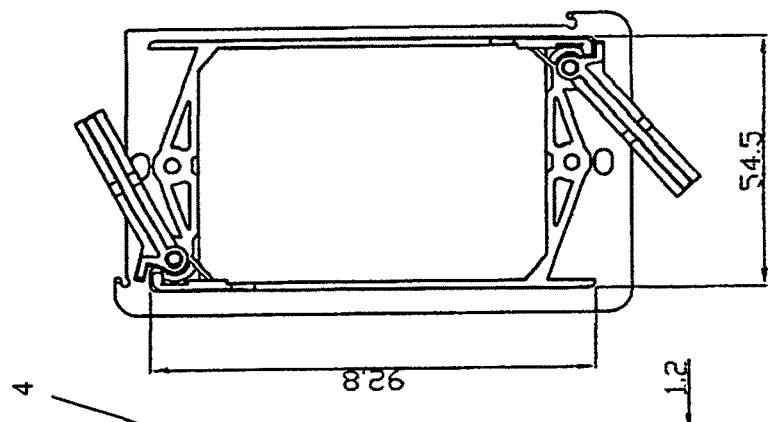
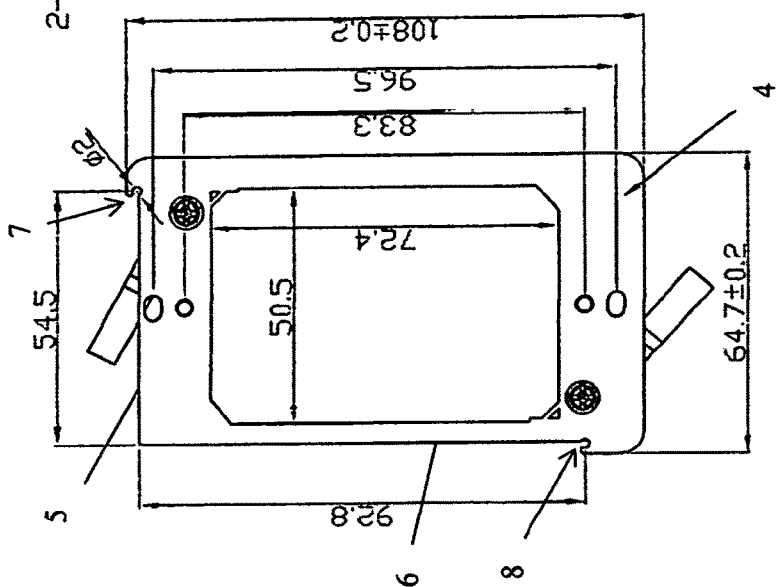
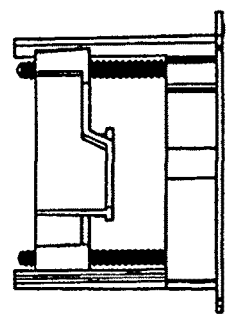

WALL PLATE BRACKET WITH INTEGRAL STRAIGHT EDGE AND METHOD OF USING SAME

TECHNICAL FIELD

The exemplary teachings herein pertain to device(s), system(s) and method(s) relating to wall plate brackets, and in particular brackets or support frames for wall plate structures as may be used for the passage of communication cables, for example as disclosed in U.S. Pat. No. 7,495,171 issued to Gorin et al. on Feb. 24, 2009 and U.S. Pat. No. 6,093,890 issued to Gretz on Jul. 25, 2000, the entire disclosures of which are herein incorporated by reference. Specifically, the present disclosure relates to wall plate brackets having one or more integral straight edges used to define an area on a wall where a wall opening for the bracket is to be cut.

BACKGROUND

As explained in U.S. Pat. No. 6,093,890: "When communication cable, television cable, fiber optics or similar low voltage communication is added to an existing wall in a building, there are several ways of doing it. One is you can punch a hole in the wall and insert the outlet box and bring the cable or fiber optic through the box. Another way to do it is to use a frame plate made of metallic material which includes cutting a hole in the wall and installing the plate by bending part of the assembly." The '890 patent discloses "a plastic mounting device having an open window plate extending around an opening in a building wall with an integral right-angle flange or device wall extending into the building wall. The device has two turning screws adapted to turn flags which have been inserted into the hole to grab the far side of the building wall and rotate the screws to snug the plate and flange to the wall. The flange or device wall has a rectangular outside periphery that permits a simple rectangular cut to be made in the building wall for the ready fitting of the device." However, making such a rectangular cut can often be time consuming and problematic as discussed below.

As discussed in U.S. Pat. No. 7,495,171, the first figure therein being reproduced as herein as FIG. 16: "FIG. [16] shows [a] wall plate structure 10 that is to be mounted to a hollow wall or like structure that typically includes wall board panels that are mounted to opposite sides of studs in a wall so that the wall structure is hollow. Communication cable and other items are passed through the wall structure. FIG. [16] illustrates a wall board 12 of a typical hollow wall structure with an opening 14 formed therein. The wall plate structure 10 is to be telescopically inserted through the wall opening 14 and suspended in the opening. The wall plate structure 10 includes a wall plate 16, screen 18, and support frame 20. The support frame 20 is box-shaped and is to be thrust through the wall opening 14 so that it is out of sight when in normal use." Again, however, forming such a wall opening can be time consuming and problematic for the following reasons.

In order to cut an opening such as opening 14 in a hollow wall structure, the size of the support frame is typically determined or measured with a measuring device, and then a hole of slightly larger dimensions is typically drawn on the wall using a ruler, tape measure or other independent straight edge and/or measuring device. This involves attempting to draw each side of the outline for the hole, one at a time, and trying to keep each side aligned with the other sides, and as perpendicular and/or parallel as possible, usually by eye-balling the respective positions of the lines. This can lead to irregular shaped hole openings, or openings of improper size, which can lead to having to spend more time to correct the hole, or the need to make repairs to the wall, or the improper installation of the support frame or bracket.

Accordingly, there is a need for a better and more convenient method of forming an opening in a wall to receive a support frame or bracket of a wall plate structure. The device disclosed herein fulfills such need.

SUMMARY

The exemplary technique(s), method(s), device(s) and system(s) presented herein relate to a wall plate bracket and method of using the same, and in particular to a wall plate bracket having one or more integral straight edges used to quickly, easily and precisely define an area on a wall where a wall opening for the bracket is to be cut. The exemplary device(s), method(s) and system(s) disclosed herein include a wall plate bracket having a generally rectangular front face plate to which a wall plate (not shown) mounts. The front face plate has along at least two sides, integral straight edges. In a preferred embodiment, a straight edge is formed substantially along a top or bottom portion of the front face plate, and a side straight edge is formed substantially along a side portion of the front face plate. Two straight edges meet at a corner of the front face plate to form a ninety degree angle. A recess resembling about three quarters of an eyelet is formed at an end of the top straight edge, and another such recess at an end of the side straight edge. These recesses mark the beginning/end of the two straight edges, which together form an L shape.

In use, the front face plate of the bracket is turned over and held against a wall at a location where installation of a wall plate is desired. A mark line is then made or drawn from one of the recesses, continuing along the straight edges, to the other recess. The bracket is then rotated 180 degrees, and the recesses are aligned with the ends of mark/line previously made or drawn. Another mark/line is then made or drawn from one of the recesses, continuing along the straight edges, to the other recess. The front face plate of the bracket is removed from the wall, leaving the two drawn marks/lines which together have thus formed a proper rectangle defining the wall opening to be cut.

Additional objects, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 1 is a front view of the support structure or bracket of the present disclosure.

FIG. 2 is a left side view of the support structure or bracket of the present disclosure.

FIG. 3 is a back view of the support structure or bracket of the present disclosure.

FIG. 4 is a top side view of the support structure or bracket of the present disclosure.

DETAILED DESCRIPTION

Figure 6:
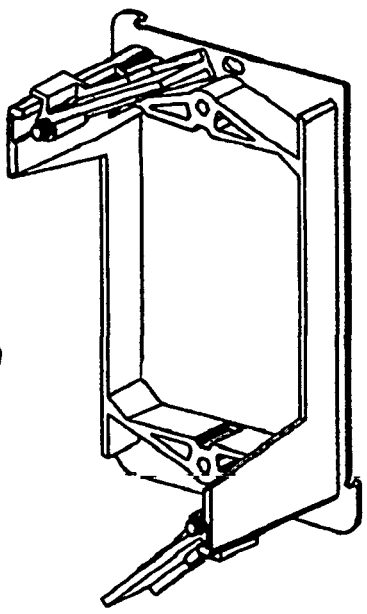
FIG. 6 is a front perspective view of the support structure or bracket of the present disclosure.
Figure 5:
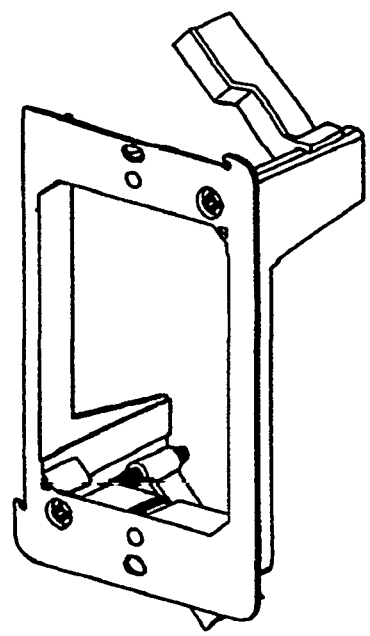
FIG. 5 is a back perspective view of the support structure or bracket of the present disclosure.
Figure 7:
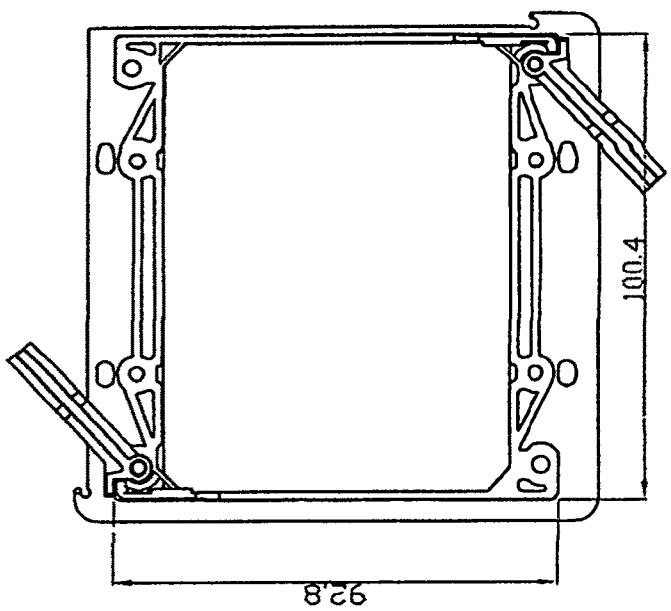
FIG. 7 is a front view of an alternately sized and shaped support structure or bracket of the present disclosure.
Figure 8:
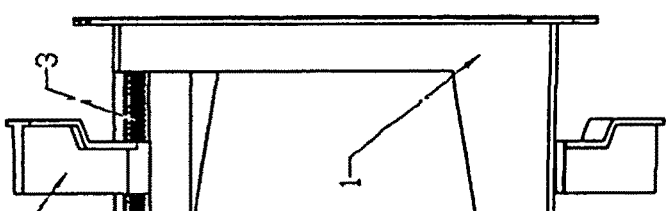
FIG. 8 is a left side view of an alternately sized and shaped support structure or bracket of the present disclosure.
Figure 9:
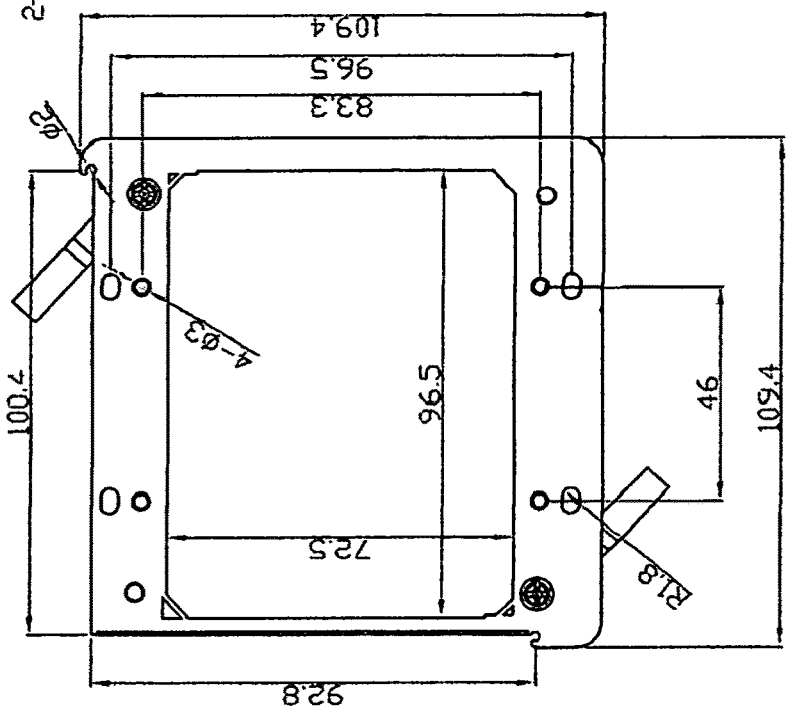
FIG. 9 is a back view of an alternately sized and shaped support structure or bracket of the present disclosure.
Figure 10:
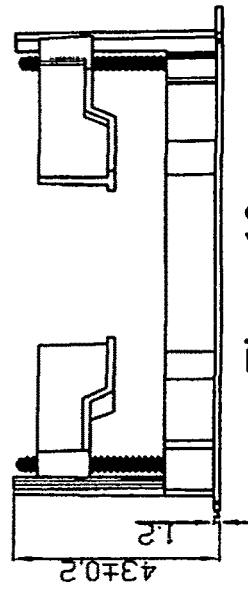
FIG. 10 is a top side view of an alternately sized and shaped support structure or bracket of the present disclosure.
Figure 12:
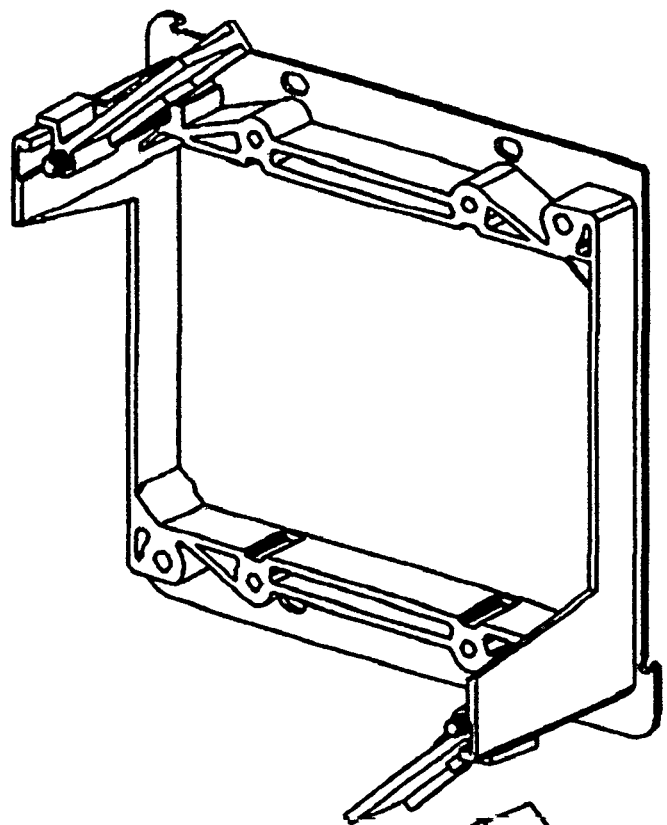
FIG. 12 is a front perspective view of an alternately sized and shaped support structure or bracket of the present disclosure.
Figure 11:
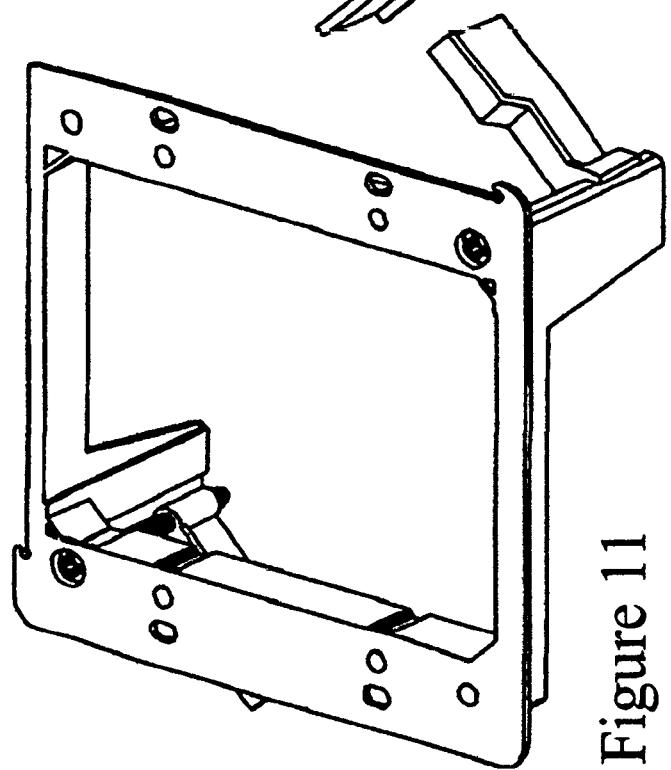
FIG. 11 is a back perspective view of an alternately sized and shaped support structure or bracket of the present disclosure.

The following description refers to numerous specific details which are set forth by way of examples to provide a thorough understanding of the relevant teachings. It should be apparent to those skilled in the art that the present teachings may be practiced without such details. In other instances, well known methods, procedures, and components have been described at a relatively high-level, without detail, in order to avoid unnecessarily obscuring aspects of the present teachings.

As can be seen in the FIGS. 1-6, and with particular reference to FIGS. 1 and 2, the support structure or bracket 1, having flags 2 connect via screws 3, has a generally rectangular front face plate 4 to which a wall plate (not shown) mounts. The front face plate 4 has along two sides a cut out portion forming the integral straight edges in the front face plate. Specifically, in FIG. 1, a top side straight edge 5 is formed substantially along the top side portion of the front face plate 4, and a left side straight edge 6 is formed substantially along the left side portion of the front face plate 4. As illustrated, the two straight edges meet in the top left corner of the front face plate 4 to form a ninety degree angle. At the right end of the top straight edge 5 is formed an alignment hole or recess 7 resembling about three quarters of an eyelet. Similarly at the bottom end of the side straight edge 6 is formed an alignment hole or recess 8 resembling about three quarters of an eyelet. These recesses or alignment holes 7 and 8 mark the beginning/end of the two straight edges 5 and 6 respectively, which together form an L-shape. It should be understood that the straight edges could be formed on the opposite sides than those illustrated.

FIGS. 7-12 illustrate an alternately sized and shaped support structure or bracket having a generally square front face plate with the two straight edges and recesses formed therein, in the same manner as discussed above with respect to FIGS. 1-6, and which function in the same manner.

Figure 15:
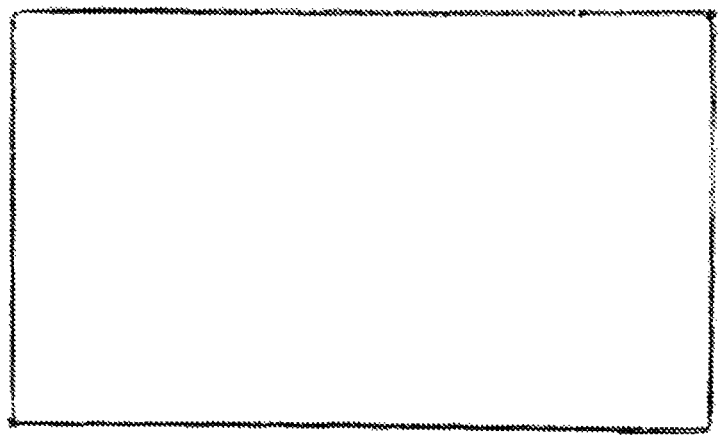
FIG. 15 illustrates use of the support structure or bracket of FIG. 1, after the combined first and second steps of the method of use.
Figure 14:
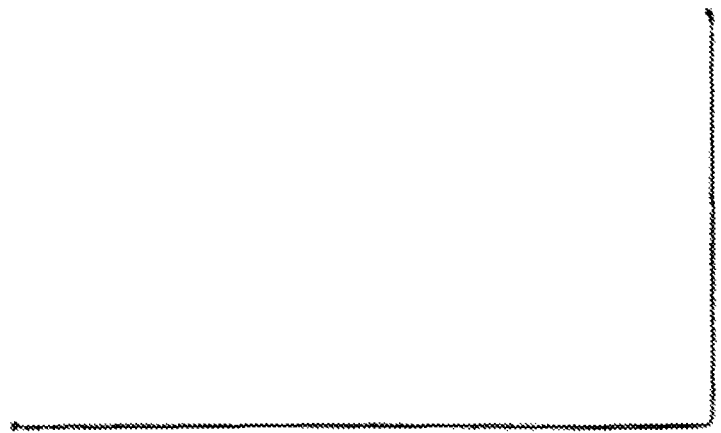
FIG. 14 illustrates use of the support structure or bracket of FIG. 1, in a second step of the method of use.
Figure 13:
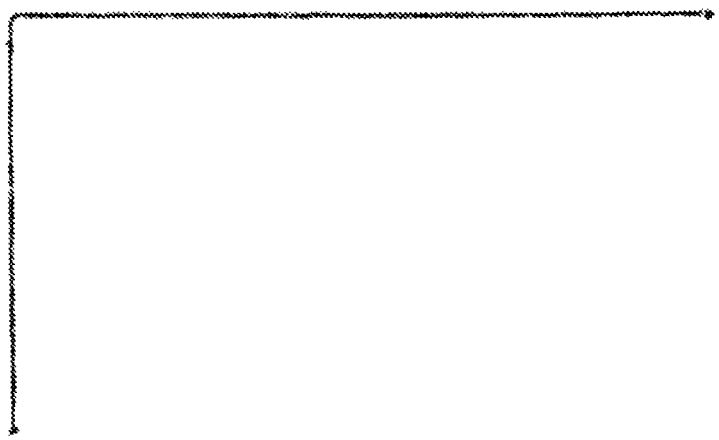
FIG. 13 illustrates use of the support structure or bracket of FIG. 1, in a first step of the method of use.
Figure 16:
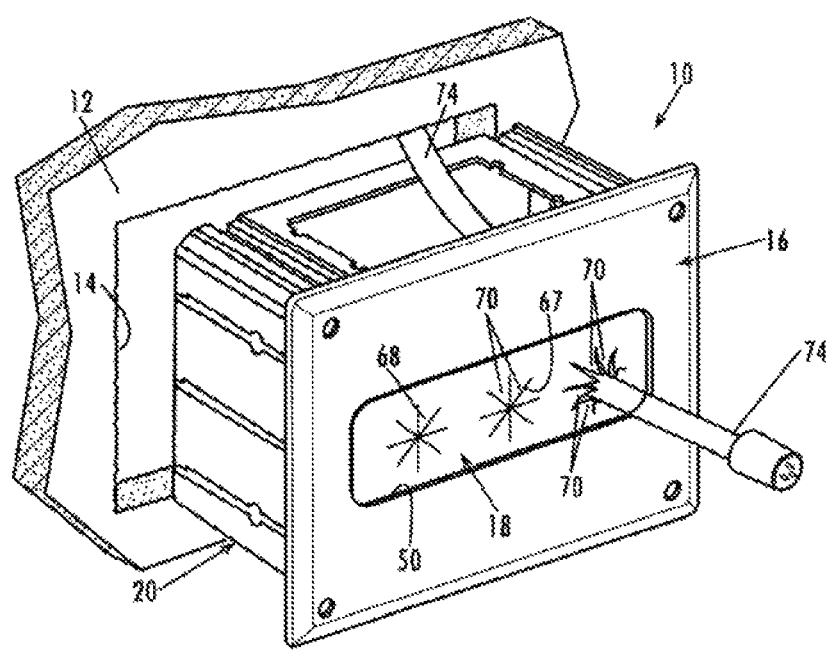
FIG. 16 illustrates a prior art support structure or bracket being positioned in a wall opening.

FIGS. 13-15 illustrate the method of use of the bracket, specifically the bracket of FIG. 1, by depicting lines drawn using the bracket of FIG. 1. In use, the bracket of FIG. 1 is turned over such that the front face plate is placed and held against a wall. Using a marking device such as a pencil, a mark is made in one of the recesses 7 or 8, and then lines are drawn or traced along the straight edges 5 and 6 to the other recess 7 or 8, where a second mark is made. In this manner, the L-shaped drawing is FIG. 13 is made on the wall. The bracket of FIG. 1 then rotated 180 degrees, and using a marking device such as a pencil, a mark is made in one of the recesses 7 or 8, and then lines are drawn or traced along the straight edges 5 and 6 to the other recess 7 or 8, where a second mark is made. In this manner, the L-shaped drawing is FIG. 14 is made on the wall. Prior to making the drawing of FIG. 14, after the bracket is rotated 180 degrees, the recesses 7 and 8 are aligned with the marks made at the ends of the drawing of FIG. 13, such that when the drawing of FIG. 14 is made, the two drawings result in a proper rectangle being formed as shown in FIG. 15. This drawn rectangle substantially has 90 degree corners and parallel and perpendicular lines defining a proper rectangle. In this manner a properly sized and shape outline of a hole/wall opening can be quickly and easily drawn without having to measure any dimensions or use any rulers or other independent straight edges.

While the above discussed embodiment(s) have been described with reference to a single gang (FIGS. 1-6) and a dual gang (FIGS. 7-12) low voltage mounting bracket, it should be understood that the wall plate bracket can take any suitable form, size and shape. In general, straight edges are provided on half of the total number of sides of the front face plate so as to allow the drawing of half of the perimeter of the opening to be cut, such that when rotated 180 degrees and aligned, the other half of the opening to be cut can be drawn using the integral straight edges. Additionally, it is foreseen that the straight edges can be interrupted by one or more tabs, protrusions or support flanges, while still allowing for substantially all of or a majority of the perimeter of the opening to be drawn. Additionally, the components of the device can be made from any suitable material, such as metal, plastic, or any suitable material capable of adequately performing their respective intended functions.

While the preferred and alternate embodiment(s) are illustrative of the structure, function and operation of the exemplary device(s), method(s) and system(s), it should be understood that various modifications may be made thereto with departing from the teachings herein. While the foregoing discussion presents the teachings in an exemplary fashion with respect to the disclosed device, method and system for a wall plate bracket, it will be apparent to those skilled in the art that the teachings may apply to any type of wall bracket structure. Further, while the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

What is claimed is:

1. A mounting bracket adapted to be positioned in an opening in a wall, the bracket comprising:
    a front face plate having a plurality of side members having internal edges defining a passageway, and external edges defining a perimeter;
    a frame structure about the internal edges of the side members of the front face plate and extending away from the front face plate;

a first straight edge formed in an external edge of a first side member of the front face plate; and a second straight edge formed in an external edge of a second side member of the front face plate;

wherein the first straight edge and the second straight edge are adapted to form an outline of a first half of a rectilinear cutout area, and are further adapted to form an outline of a second half of the rectilinear cutout area.

2. The bracket of claim 1, further comprising a writing implement tip receiving recess formed at an end of the first straight edge.

3. The bracket of claim 1, further comprising a writing implement tip receiving recess formed at an end of the second straight edge.

4. The bracket of claim 1, further comprising a first writing implement tip receiving recess formed at an end of the first straight edge, and a second writing implement tip receiving recess formed at an end of the second straight edge.

5. The bracket of claim 1, wherein the first straight edge and the second straight edge outline the rectilinear cutout area for the opening in the wall.

6. The bracket of claim 1, wherein the front face plate in a first position forms the outline of the first half of the rectilinear cutout area, and in a second position forms the outline of the second half of the rectilinear cutout area.

7. The bracket of claim 6, wherein the second position is at a 180° front face plate rotation from the first position.

8. A wall mounting bracket for mounting in an opening in a wall, the bracket comprising:

a bracket portion for extending into the opening in the wall; and a front face plate extending outward laterally from the bracket portion for abutting up against the wall adjacent the opening in the wall, wherein the front face plate comprises a top flange, a first side flange, a bottom flange and a second side flange, wherein each flange has an internal edge defining a passageway edge and an external edge defining a perimeter edge; and a marking edge formed in the exterior edge of at least two of the flanges of the front face plate;

wherein the marking edge is adapted to form an outline of a first half of a cutout area, and is further adapted to form an outline of a second half of a cutout area.

9. The bracket of claim 8, wherein a first marking edge is formed in one of the top and bottom flanges of the front face plate, and a second marking edge is formed in one of the first and second side flanges of the front face plate.

10. The bracket of claim 9, wherein the first marking edge and the second marking edge are perpendicular to each other and meet at a corner.

11. The bracket of claim 9, wherein a first alignment hole is formed at an end of the first marking edge, and a second alignment hole is formed at an end of the second marking edge.

12. The racket of claim 9, wherein the first marking edge and the second marking edge outline a first and second perimeter edge of the opening in the wall when the front face plate is in a first position.

13. The bracket of claim 12, wherein the first marking edge and the second marking edge outline a third and fourth perimeter edge of the opening in the wall when the front face plate is in a second position.

14. The bracket of claim 13, wherein the second position is at a 180° front face plate rotation from the first position.

15. The bracket of claim 8, wherein an alignment hole is formed at an end of the marking edge.

16. A wall plate bracket for an opening in a wall, the bracket comprising:

a frame structure having a front face plate, the front face plate having a plurality of side members with internal edges defining a passageway and external edges defining a perimeter;

a first marking edge formed in an external edge of a first side member of the front face plate; and a second marking edge formed in an external edge of a second side member of the front face plate;

wherein the first marking edge and the second marking edge are adapted to form an outline of a first half of a cutout area when the front face plate is in a first position, and are further adapted to form an outline of a second half of the cutout area when the front face plate is in a second position.

17. The bracket of claim 16, wherein the second position is at a 180° front face plate rotation from the first position.

18. The bracket of claim 16, wherein a first alignment hole is formed at an end of the first marking edge, and a second alignment hole is formed at an end of the second marking edge.

19. The bracket of claim 18, wherein the second position is at a 180° front face plate rotation from the first position.

20. The bracket of claim 19, where in first alignment hole and the second alignment hole have an initial position and a rotated position, and wherein the rotated position of the first alignment hole is the same as the initial position of the second alignment hole, and wherein the rotated position of the second alignment hole is the same as the initial position of the first alignment hole.

* * * * *